(12) United States Patent
Patro

(10) Patent No.: US 8,326,272 B1
(45) Date of Patent: Dec. 4, 2012

(54) SYSTEM, METHOD AND COMPUTER PROGRAM PRODUCT FOR SUBSCRIBER-SPECIFIC POLICIES

(75) Inventor: Debabrata Patro, Pune (IN)

(73) Assignee: Amdocs Software Systems Limited, Dublin (IE)

( * ) Notice: Subject to any disclaimer, the term of this patent is extended or adjusted under 35 U.S.C. 154(b) by 1507 days.

(21) Appl. No.: 11/460,069

(22) Filed: Jul. 26, 2006

(51) Int. Cl.
*H04M 11/00* (2006.01)

(52) U.S. Cl. .................................... 455/414.1; 455/405

(58) Field of Classification Search .................. 455/405, 455/406, 407, 408, 414.1; 379/114.16, 114.15, 379/114.17, 114.2, 121.02, 202.01
See application file for complete search history.

(56) References Cited

U.S. PATENT DOCUMENTS

| | | | | |
|---|---|---|---|---|
| 5,291,543 A | * | 3/1994 | Freese et al. | 455/408 |
| 7,643,623 B2 | * | 1/2010 | Cai | 379/114.16 |
| 2002/0065718 A1 | | 5/2002 | Otani et al. | 705/14 |
| 2004/0259534 A1 | * | 12/2004 | Chaudhari et al. | 455/414.1 |
| 2005/0204030 A1 | * | 9/2005 | Koch et al. | 709/223 |
| 2005/0288953 A1 | | 12/2005 | Zheng | 705/1 |
| 2007/0115264 A1 | * | 5/2007 | Yu et al. | 345/173 |

* cited by examiner

*Primary Examiner* — Ajit Patel
*Assistant Examiner* — Myron K Wyche
(74) *Attorney, Agent, or Firm* — Zilka-Kotab, PC

(57) ABSTRACT

A system, method and computer program product are included for governing a telecommunication network utilizing subscriber selected policies. A predetermined number of policies governing at least one aspect of a usage of a telecommunication network by subscribers are defined. In use, a selection of at least one of the policies is received from at least one subscriber. Furthermore, the at least one aspect of the usage of the telecommunication network by the at least one subscriber is governed based on the selection.

23 Claims, 5 Drawing Sheets

SYSTEM, METHOD AND COMPUTER PROGRAM PRODUCT FOR SUBSCRIBER-SPECIFIC POLICIES

FIELD OF THE INVENTION

The present invention relates to telecommunication networks, and more particularly to managing usage of a telecommunication network by subscribers.

BACKGROUND

Currently, there are many services available for purchase that require replenishment in order to prolong their usefulness. For example, mobile phone services, computer virus scanning services, etc. often require periodic monetary contributions to their associated providers so as to keep such services operating effectively. This type of replenishment activity is widely utilized with respect to the telecommunication services industry.

Generally, telecommunication servicers support market level replenishment policies for replenishment activities. In a few instances, telecommunication servicers support replenishment policies at the sub-market level. However, such sub-markets require unique recharge (i.e. replenishment) vouchers to differentiate between the different sub-markets, thus requiring the ordering, distributing and maintaining of a broad array of recharge vouchers. In addition, the market level and sub-market level policies result in replenishment policies being dictated by policies at such levels, thus creating replenishment policy definitions that are broadly utilized by all subscribers.

In summary, currently available systems do not provide subscribers with adequate choices for tailoring their own individual replenishment policy (or any other policy, for that matter) at the subscriber-level. There is thus a need for overcoming these and/or other problems associated with the prior art.

SUMMARY

A system, method and computer program product are included for governing a telecommunication network utilizing subscriber selected policies. A predetermined number of policies governing at least one aspect of a usage of a telecommunication network by subscribers are defined. In use, a selection of at least one of the policies is received from at least one subscriber. Furthermore the at least one aspect of the usage of the telecommunication network by the at least one subscriber is governed based on such selection.

DETAILED DESCRIPTION

Figure 1:
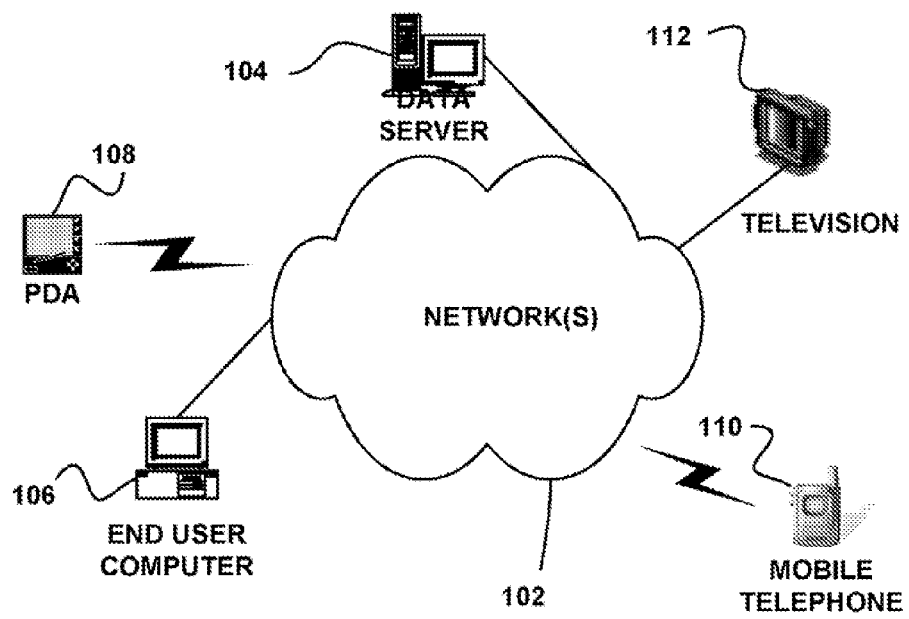
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form of a telecommunications network which may, in turn, include a local area network (LAN), a wireless network, a wide area network (WAN) such as the Internet, peer-to-peer network, cable network, voice and data services network, and/or any other network capable of providing telecommunication services. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

It should be noted that any of the foregoing devices in the present network architecture 100, as well as any other unillustrated hardware and/or software, may be may be equipped with the capability of providing subscriber-specific policies with respect to a telecommunication network. More information regarding such capability will be set forth hereinafter in greater detail during reference to subsequent figures.

Figure 2:
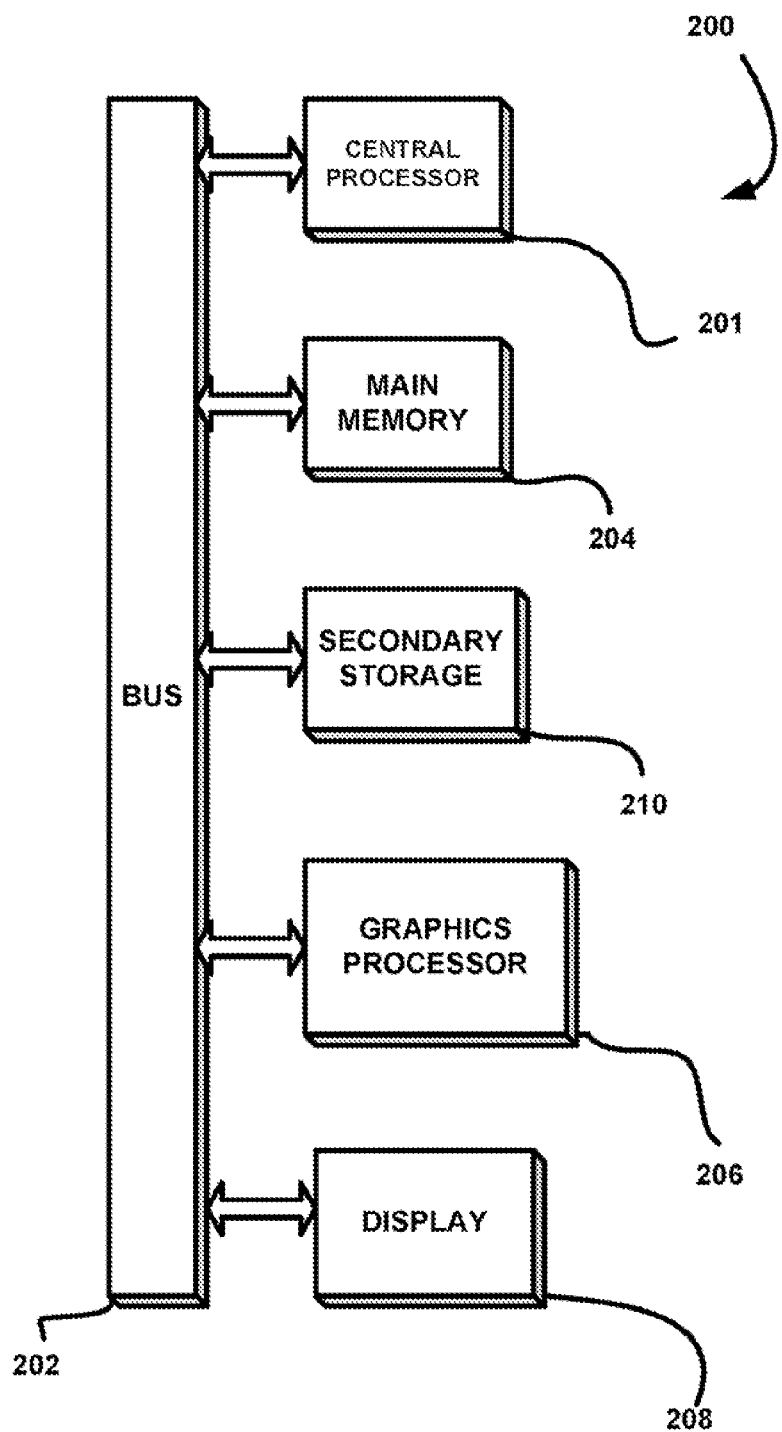
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed enable the computer system 600 to perform various functions. Memory 204, storage 210 and/or any other storage are possible examples of computer-readable media.

Figure 3:
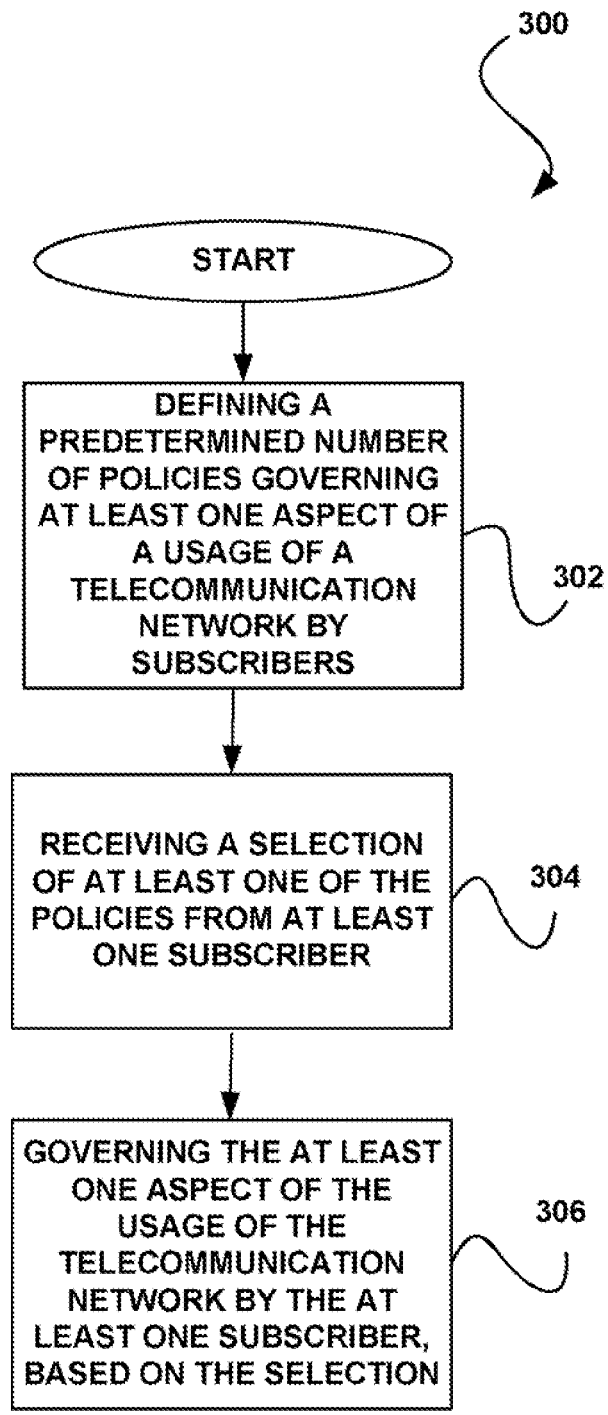
FIG. 3 shows a method for governing telecommunication network usage utilizing a subscriber-based policy, in accordance with one embodiment.

FIG. 3 shows a method 300 for governing telecommunication network usage utilizing a subscriber-based policy, in accordance with one embodiment. As an option, the method 300 may be implemented in the context of the details of FIG. 1 and/or 2. Of course, however, the method 300 may be carried out in any desired environment. Further, the aforementioned definitions may equally apply to the description below.

As shown in operation 302, a predetermined number of policies governing at least one aspect of a usage of a telecommunication network by subscribers are defined. In the context of the present description, the subscribers may include any customers (e.g. businesses and/or individuals) that subscribe to use a telecommunication network. In one embodiment, such subscribers may each optionally have an account with a telecommunication network service provider for managing their use of the telecommunication network.

Further, in the context of the present description, the policies may each include one or more rules that govern the at least one aspect of the usage of the telecommunication network by the subscribers. For example, in one optional embodiment, the policies may include parameters such as a bonus amount parameter, a validity period parameter, a free service parameter and/or any other parameters capable of being associated with usage of a telecommunication network. Furthermore, in other embodiments, the policies may include a recharge amount that is associated with such parameters. In this way, the policy may optionally define usage available in exchange for a specified recharge amount paid by the subscriber.

Still yet, the at least one aspect of the usage of the telecommunication network may be associated with a recharge of accounts of subscribers. Thus, the predetermined number of policies may, in one embodiment, govern the recharging of subscriber accounts. In particular, such policies may each dictate when a subscriber's subscription for a telecommunication network service may be enabled and/or disabled based on whether a particular monetary recharge amount has been done by the subscriber.

As another option, the at least one aspect of the usage of the telecommunication network may be associated with a recharge bonus. For instance, the predetermined number of policies may each govern a bonus amount of enabled telecommunication network service provided to a subscriber. Such bonus amount may include an amount of telecommunication network service that is enabled beyond an amount of service paid for by a subscriber. The recharge bonus may also include a credit to the subscriber's account for the bonus amount, for any other purpose. Of course, the recharge bonus may include any bonus provided to a subscriber in association with a policy.

As yet another option, the at least one aspect of the usage of the telecommunication network may be associated with a validity of accounts of the subscribers. Thus, each policy may, for example, govern a period of time for which a service paid for by a subscriber is valid. In particular, the policy may govern a period of time for which the telecommunication network service is enabled, based on an amount of service paid for by a subscriber.

Of course, it should be noted that any aspect of a telecommunication network service may be governed by the predetermined number of policies. In addition, any of the above described aspects along with any desired additional aspects may be governed in combination utilizing any of the predetermined number of policies.

A selection of at least one of the policies is then received from at least one subscriber, as shown in operation 304. The selection and/or receiving of the at least one policy may optionally be performed by a subscriber utilizing a graphical user interface. One example of such a graphical user interface will be described in more detail with respect to FIG. 5. Thus, a subscriber may be allowed to select a policy from a plurality of policies to be applied to the subscriber's telecommunication network service account. In addition to or instead of the graphical user interface, it may be possible for the telecommunication provider to enable other modes of updating the policy such as by sending a short message service (SMS) message to a specific number, by sending an unstructured supplementary services data (USSD) message, and/or by selecting the updates using an interactive voice response (IVR) system with the updates to be done or to query the details of the currently selected policies.

To this end, the at least one aspect of the usage of the telecommunication network by the at least one subscriber is governed based on the subscriber's policy selection, as shown in operation 306. Again, such aspect(s) may include a recharge amount, a recharge bonus, a validity period, etc.

In this way, a subscriber-level of policies may be employed, such that each subscriber may select a policy to be attributed to the subscribers telecommunication network service account. Thus, a personalized telecommunication network service may be provided to subscribers, where such subscribers may opt for specific predefined service benefits as desired. Such subscriber-level policies may therefore, in some embodiments, result in higher customer loyalty since the needs of different customers may be met on a personal basis, while also attracting additional customers desiring such personalized service.

More illustrative information will now be set forth regarding various optional architectures and uses in which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
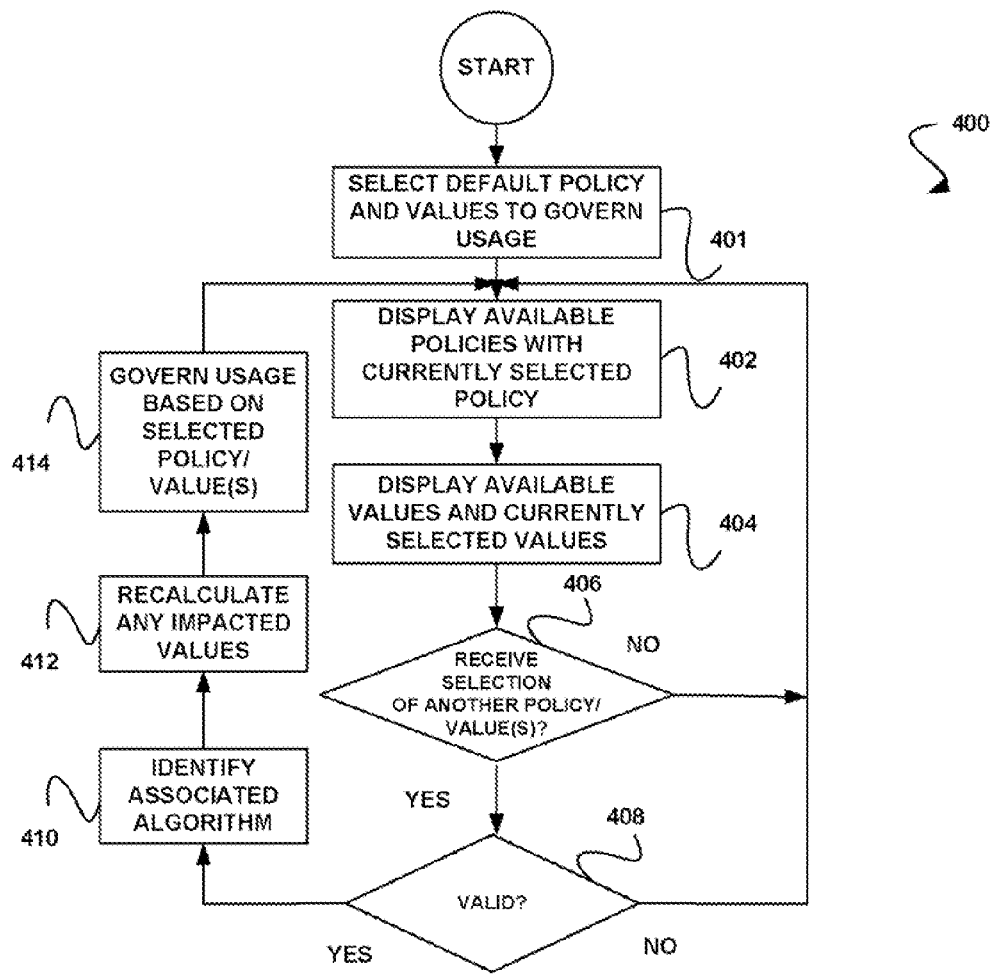
FIG. 4 shows a method for governing telecommunication network usage utilizing a subscriber-based policy, in accordance with another embodiment.

FIG. 4 shows a method 400 for governing telecommunication network usage utilizing a subscriber-based policy, in accordance with another embodiment. As an option, the method 400 may be implemented in the context of the details of FIGS. 1-3. Of course, however, the method 400 may be carried out in any desired environment. Again, the aforementioned definitions may equally apply to the description below.

As show in operation 401, a default policy and associated values may be selected (by default) to govern telecommunication network usage by subscribers. In particular, at least one default policy [and value(s)] may be defined for governing at least one aspect of the usage of the telecommunication network by at least one subscriber. Thus, all subscribers with a telecommunication network service account may be provided with a default policy that governs their telecommunication network service account.

As an option, subscribers may be provided with different default policies based on a characteristic of the subscriber (e.g. monthly charges, monthly usage, type of subscriber, etc.). However, in other embodiments, subscribers may also be provided with default policies that are defined for each telecommunication network service market and/or sub-market. For example, subscribers of a single telecommunication network service market may be provided with a single default policy, such that the same default policy may be applied to all subscribers' accounts in a single telecommunication network service market.

Further, the default values associated with the default policy may include any values associated with parameters capable of defining a policy that governs telecommunication network usage of subscribers. In particular, the values may be associated with parameters such as a recharge price, a validity period, a recharge bonus amount, a free service amount, etc. Of course, an values capable of being associated with a policy that governs telecommunication network usage of subscribers may be utilized.

Available policies and a currently selected policy may then be displayed, as shown in operation 402. For example, the available policies and currently selected policy may be displayed to a subscriber utilizing a graphical user interface. Further, the currently selected policy may include any policy that is currently being utilized to govern telecommunication network usage of the subscriber's account. If a policy has not been selected by the subscriber to govern the subscriber's telecommunication network usage, the default policy described with respect to operation 401 may be the currently selected policy. Thus, the subscriber may be allowed to view a policy currently being applied to such subscriber's telecommunication network service account, and further view other different predefined policy options.

Moreover, available values and currently selected values may also be displayed, as shown in operation 404. In one optional embodiment, the currently selected values may be identified utilizing a policy identifier associated with the currently selected policy. Specifically, the policy identifier may be utilized to identify within a table any currently selected values to be used in conjunction with the currently selected policy. Further, if values have not been selected by the subscriber in association with a policy that governs the subscriber's telecommunication network service usage, default values may be the currently selected values utilized in conjunction with the policy. Of course, the available values may include any predefined and/or user selected values capable of being utilized with a policy applicable to a subscribers account.

It is then determined in decision 406 whether a selection of another policy and/or any other values has been received. Such selection may be received utilizing the graphical user interface displaying the currently selected policy/values and the available policies/values. There may be other techniques such as a SMS message. USSD message or inputs through an IVR system, for receiving such selection. For example, it may be determined whether a subscriber has selected to apply a different policy to the subscriber's account other than the currently selected policy described above. In addition, it may be determined whether the subscriber has selected to apply different values to the currently selected policy or has selected to apply specific values to a different policy.

Thus, the subscriber may select a policy and/or values to be applied to the subscriber's account. In this way, the subscriber may select a policy with default values or a policy with personalized values to be applied to the subscriber's account.

If it is determined in decision 406 that a selection of another policy and at least one value has not been made, the currently selected policy and values described above may continue to govern the usage of the telecommunication network by the subscriber. For instance, if the currently selected policy is a default policy, the default policy may continue to govern the usage of the telecommunication network by the subscriber. In the same way, if the currently selected values are default values, such default values may continue to be applied to the currently selected policy for use in conjunction therewith.

If, however, it is determined in decision 406 that a selection of another policy and/or at least one value has been made, it may also be determined if the selected policy and/or at least one value are valid. Note operation 408. In one embodiment, the validity of the selected policy and/or at least one value may be determined by comparing such selected policy and/or at least one value to a database of valid policies and associated values. In other embodiments, an algorithm may be used for such purpose.

For instance, each available policy may be associated with valid values and/or valid combinations of values. Of course, the validity of the selected policy and/or at least one value may be determined in any desired manner. Table 1 illustrates one example of a database of valid policies and associated values. Of course such table is set forth by way of example only and is not to be construed as limiting in any manner.

TABLE 1

| Recharge Amount | Policy Identifier | Parameters | Allowed Values/ Combinations |
|---|---|---|---|
| 10 USD (US Dollars) | P1 | Bonus Amount (BA), Validity Period (VP) | 1. BA = 1 USD + VP = 1 Month (Default)<br>2. BA = 3 USD + VP = 0 Days (use the same day) |
| 20 USD (US Dollars) | P2 | Bonus Amount (BA), Validity Period (VP) | 1. BA = 3 USD + VP = 60 Days (Default)<br>2. BA = 2 USD + VP = 90 Days<br>3. BA = 0 USD + VP = 180 Days |

If it is determined in decision 408 that the selected policy and/or at least one value are not valid, a notification may be displayed regarding such invalidity (not shown). The notification may also describe valid values and/or combinations of values associated with available policies and/or the currently selected policy. The currently selected policy and available policies may then be displayed again, as described in operation 402, along with the currently selected values and available values, as described in operation 404. Thus, the subscriber may be allowed to re-select another policy and/or values that are valid.

If however, it is determined in decision 408 that a policy selected in operation 406 is valid, the selected policy may become the currently selected policy. In addition, if it is determined in decision 408 that values selected in operation 406 are valid, such selected values may be applied to the currently selected policy. In particular, an algorithm associated with the currently selected policy may be identified, as shown in operation 410. The algorithm may include any algorithm utilized to calculate values associated with a policy. Specific examples of such algorithms are shown above with respect to Table 1 (e.g. the allowed values/combinations column).

Values impacted by the currently selected policy and/or any selected values may then be recalculated utilizing the algorithm, as shown in operation 412. For example, any values not specified by the subscriber that are necessary to the currently selected policy may be calculated utilizing the algorithm and any selected values. Such currently selected policy may then be applied to the subscriber's account such that the policy governs usage of the telecommunication network by the subscriber based on the associated values. Note operation 414. As another option, the currently selected policy and currently selected values may be displayed.

In one specific example, a subscriber may select to have a policy P1 applied to a telecommunication network service account. The subscriber may select to have the other values while doing a recharge value of 100 United States dollars (USD). Based on such recharge value, other values associated with P1 may be calculated utilizing an algorithm associated with P1. In the present example, a validity period and recharge bonus may be calculated. For instance, the validity period may include a 6 month period in which the telecommunication network is enabled for use by the subscriber. Additionally, a recharge bonus value of 10 USD may be applied to the subscriber's account, such that the subscriber may be provided with additional network usage worth the equivalent of 10 USD. Such calculated values may be displayed for user review in response to the entry of the desired recharge value, thus allowing the user to try different combinations of values.

In another specific example, another subscriber may prefer to receive a greater validity period in exchange for the recharge bonus. Thus, such subscriber may select a policy P2 that provides a longer validity period without providing any recharge bonus. The subscriber may optionally select a desired validity period, and a recharge value due by the subscriber for such validity period may be calculated utilizing an algorithm associated with P2.

In Yet another example, a subscriber may select a policy P3 that provides a greater recharge bonus based on a minimum monthly recharge value committed to the subscriber. In particular, if the subscriber commits pay a recharge value of more than 50 USD for 3 months, the subscriber may receive a recharge bon us of 10% for every recharge value paid. On the other hand, if the subscriber commits to pay a recharge value of more than 100 USD for 3 months, the subscriber may receive a recharge bonus of 15% for every recharge value paid.

In still yet another example, a subscriber may select a policy P4 that allows the subscriber to specify that a recharge value is to be applied a particular portion of the telecommunication network service in exchange for a recharge bonus. Specifically, if the telecommunication network service subscribed to by the subscriber is a mobile telephone service, the subscriber may select policy P4 that does not necessarily provide any bonus amount (or a reduced bonus amount) but that provides for a certain number of additional free SMS messages. In this way, an algorithm associated with P4 may ensure a tradeoff between values associated with P4.

Table 2 illustrates just one exemplar policy that may be utilized with the present example.

TABLE 2

| Recharge Amount | Policy Identifier | Parameters | Allowed Values/ Combinations |
|---|---|---|---|
| 10 USD | P1 | Bonus Amount (BA), Validity Period (VP), Free SMS (FS) | 1. BA = 1 USD + VP = 1 Month + FS = 0 (Default)<br>2. BA = 3 USD + VP = 0 Days + FS = 0 (use the same day)<br>3. BA = 0 USD + VP = 1 Month + FS = 15 (Represents 5 "extra SMS") |

In this way, the method 400 provides a way for a subscriber to personalize a policy that governs usage of a telecommunication network by the subscriber. In particular, the subscriber may select a policy governing the subscriber's telecommunication network usage based on parameters important to the subscriber.

Additionally, it may still be ensured that the personalized policies are within predefined valid policy thresholds.

Figure 5:
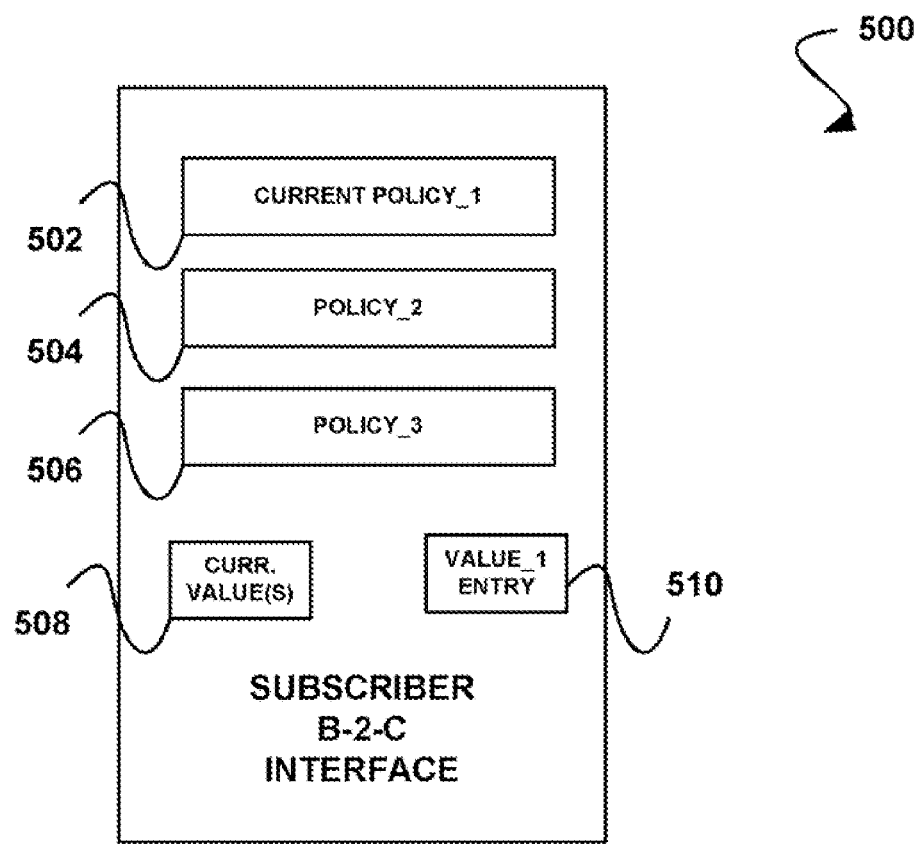
FIG. 5 shows a graphical user interface for creating a subscriber-based policy, in accordance with yet another embodiment.

FIG. 5 shows a graphical user interface (GUI) 500 for creating a subscriber-based policy, in accordance with yet another embodiment. As an option, the GUI 500 may be implemented in the context of the details of FIGS. 1-4. Of course, however, the GUI 500 may be carried out in any desired environment. Again, the aforementioned definitions may equally apply to the description below.

As shown, a GUI 500 may be presented to a subscriber. The GUI 500 may display a currently selected policy 502 that currently governs the subscriber's use of a telecommunication network. The currently selected policy 502 may include a default policy if the subscriber has not selected the currently selected policy. The GUI 500 may also display available policies 504 and 506 that the subscriber may select to govern the subscriber's use of the telecommunication network.

Still yet, the GUI 500 may display currently selected values 508 associated with the currently selected policy 502. Again, such currently selected values 508 may include default values if the subscriber has not selected the currently selected values. The GUI 500 may also display available values 510 that may be selected to be used in conjunction with the currently selected policy 502. Furthermore, such available values 510 may be dynamic in that they may change according to whether the subscriber has selected another available policy 504 and 506 to govern. Of course, the available values 5110 may include set values and/or fields for a subscriber to manually enter values, etc.

While various embodiments have been described above it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   displaying a plurality of policies governing at least one aspect of a usage of a telecommunication network by subscribers, the policies including at least one default policy for governing the at least one aspect of the usage of the telecommunication network by at least one subscriber, wherein the at least one aspect governed by each of the policies is the same across the policies;
   displaying a plurality of values associated with at least one of the policies, the plurality of displayed values including a predefined value capable of utilization with the at least one of the policies that is applicable to an account of the at least one subscriber;
   receiving a selection of at least one of the policies from the at least one subscriber, the selection including at least one of the values for use in conjunction with the at least one policy for governing the at least one aspect of the usage of the telecommunication network by the at least one subscriber; and
   determining if the selection is valid, and governing the at least one aspect of the usage of the telecommunication network by the at least one subscriber based on the selection, in response to a determination that the selection is valid;
   wherein, if the at least one policy is not selected, the at least one aspect of the usage of the telecommunication network by the at least one subscriber is governed based on the at least one default policy;
   wherein, if it is determined that the selected policy is valid, an algorithm associated with the selected policy is identified, and the identified algorithm is utilized to calculate values associated with the selected policy, the values calculated by the algorithm associated with the selected polic including a validity period in which the telecommunication network is enabled for use by the at least one subscriber, and a recharge bonus associated with the selected policy providing the at least one subscriber with additional usage of the telecommunication network that does not require payment by the at least one subscriber.

2. The method of claim 1, wherein the at least one aspect is associated with a recharge of accounts of the subscribers.

3. The method of claim 2, wherein the at least one aspect is associated with the recharge bonus.

4. The method of claim 1, wherein the at least one aspect is associated with a validity of accounts of the subscribers.

5. The method of claim 1, and further comprising defining at least one default value for use in conjunction with the at least one policy for governing the at least one aspect of the usage of the telecommunication network by the at least one subscriber.

6. The method of claim 5, wherein, if the at least one value is not selected, the at least one aspect of the usage of the telecommunication network by the at least one subscriber is governed based on the at least one policy in conjunction with the at least one default value.

7. The method of claim 1, wherein the selection further includes a first value for use in conjunction with the at least one policy for governing the at least one aspect of the usage of the telecommunication network by the at least one subscriber, and further comprising calculating a second value based on the first value.

8. The method of claim 7, and further comprising displaying the second value.

9. The method of claim 1, wherein the algorithm ensures a tradeoff between the calculated values.

10. The method of claim 1, wherein the receiving is performed utilizing a graphical user interface.

11. The method of claim 10, and further comprising displaying the policies utilizing the graphical user interface.

12. The method of claim 1, wherein the selection is received by selecting one of the policies utilizing at least one of a graphical user interface, a short message service (SMS) message, an unstructured supplementary services data (USSD) message, and an interactive voice response (IVR) system.

13. The method of claim 1, wherein the telecommunication network includes a wireless network.

14. The method of claim 1, wherein the telecommunication network provides both voice and data services.

15. A computer program product embodied on a non-transitory computer readable medium, comprising:
   computer code for displaying a plurality of policies governing at least one aspect of a usage of a telecommunication network by subscribers, the policies including at least one default policy for governing the at least one aspect of the usage of the telecommunication network by at least one subscriber, wherein the at least one aspect governed by each of the policies is the same across the policies;
   computer code for displaying a plurality of values associated with at least one of the policies, the plurality of displayed values including a predefined value capable of utilization with the at least one of the policies that is applicable to an account of the at least one subscriber;
   computer code for receiving a selection of at least one of the policies from the at least one subscriber, the selection including at least one of the values for use in conjunction with the at least one policy for governing the at least one aspect of the usage of the telecommunication network by the at least one subscriber; and
   computer code for determining if the selection is valid, and governing the at least one aspect of the usage of the telecommunication network by the at least one subscriber based on the selection, in response to a determination that the selection is valid;
   wherein the computer program product is operable such that, if the at least one policy is not selected, the at least one aspect of the usage of the telecommunication network by the at least one subscriber is governed based on the at least one default policy;
   wherein the computer program product is operable such that, if it is determined that the selected policy is valid, an algorithm associated with the selected policy is identified, and the identified algorithm is utilized to calculate values associated with the selected policy, the values calculated by the algorithm associated with the selected policy including a validity period in which the telecommunication network is enabled for use by the at least one subscriber, and a recharge bonus associated with the selected policy providing the at least one subscriber with additional usage of the telecommunication network that does not require payment by the at least one subscriber.

16. A system, comprising:
   a database for storing a plurality of policies governing at least one aspect of a usage of a telecommunication network by subscribers, the policies including at least one default policy for governing the at least one aspect of the usage of the telecommunication network by at least one subscriber, wherein the at least one aspect governed by each of the policies is the same across the policies;
   a graphical user interface for displaying the policies and a plurality of values associated with at least one of the policies, the plurality of displayed values including a predefined value capable of utilization with the at least one of the policies that is applicable to an account of the at least one subscriber, and further for receiving a selection of at least one of the policies from the at least one subscriber, the selection including at least one of the values for use in conjunction with the at least one policy for governing the at least one aspect of the usage of the telecommunication network by the at least one subscriber; and
   a processor in communication with the database and the graphical user interface, the processor for determining if the selection is valid, and governing the at least one aspect of the usage of the telecommunication network by the at least one subscriber based on the selection, in response to a determination that the selection is valid;
   wherein the system is operable such that, if the at least one policy is not selected, the at least one aspect of the usage of the telecommunication network by the at least one subscriber is governed based on the at least one default policy;
   wherein the system is operable such that, if it is determined that the selected policy is valid, an algorithm associated with the selected policy is identified, and the identified algorithm is utilized to calculate values associated with the selected policy, the values calculated by the algorithm associated with the selected policy including a validity period in which the telecommunication network is enabled for use by the at least one subscriber, and a recharge bonus associated with the selected policy providing the at least one subscriber with additional usage of the telecommunication network that does not require payment by the at least one subscriber.

17. The method of claim 1, wherein the at least one default policy utilized for governing the at least one aspect of the usage of the telecommunication network by the at least one subscriber is automatically selected from a plurality of default policies based on a characteristic of the at least one subscriber.

18. The method of claim 1, wherein the validity is determined by comparing the selection to a database of valid policies and associated values.

19. The method of claim 1, wherein a notification is displayed if it is determined that the selection is not valid, the notification including valid combinations of the values associated with the policies.

20. The method of claim 1, wherein the policies and the values are displayed along with the selected policy and the at least one selected value.

21. The method of claim 1, wherein a predetermined number of the policies each indicate a recharge bonus of telecommunication network services provided to the at least one subscriber.

22. The method of claim 1, wherein the selection of at least one of the policies includes a selection of a recharge value, and in response to the selection of the recharge value, the validity period and the recharge bonus are calculated by the algorithm and displayed for review.

23. The method of claim 14, wherein the selected policy further requires the at least one subscriber to specify that a recharge value is to be applied to a portion of the telecommunication network services subscribed to by the at least one subscriber in exchange for the recharge bonus.

* * * * *